(12) United States Patent
Jing

(10) Patent No.: US 6,946,101 B1
(45) Date of Patent: Sep. 20, 2005

(54) BURNER FOR PRODUCING CARBON BLACK

(76) Inventor: Lianpeng Jing, Im Park 4, Zollikofen (CH), 3052

( * ) Notice: Subject to any disclaimer, the term of this patent is extended or adjusted under 35 U.S.C. 154(b) by 0 days.

(21) Appl. No.: 09/979,664
(22) PCT Filed: May 19, 2000
(86) PCT No.: PCT/CH00/00282

§ 371 (c)(1),
(2), (4) Date: Nov. 26, 2001

(87) PCT Pub. No.: WO00/73699

PCT Pub. Date: Dec. 7, 2000

(30) Foreign Application Priority Data

May 26, 1999 (EP) .............................. 99810457

(51) Int. Cl.[7] ............................................. F23D 14/20
(52) U.S. Cl. ..................... 422/150; 422/151; 422/156; 431/145; 431/187; 431/188; 431/189
(58) Field of Search .............................. 423/449.1, 450; 431/187, 188, 189, 145; 422/150, 151, 156

(56) References Cited

U.S. PATENT DOCUMENTS

| 1,597,991 A | * | 8/1926 | Heller | ......................... 431/293 |
| 2,599,981 A | * | 6/1952 | Ekholm | ...................... 423/455 |
| 4,305,291 A | * | 12/1981 | Nelson | ...................... 73/865.5 |
| 4,751,069 A | | 6/1988 | Ducote et al. | ............... 423/450 |
| 5,262,146 A | * | 11/1993 | Kanamaru et al. | ........... 423/455 |
| 5,891,414 A | | 4/1999 | Kanamaru et al. | |

FOREIGN PATENT DOCUMENTS

DE 28 42 977 4/1980
EP 0 353 746 A2 2/1990

OTHER PUBLICATIONS

Lianpeng Jing, "Generation of Combustion Soot Particles for Calibration Purposes," 2nd ETH Workshop on Nanoparticle Measurement, ETH Hönggerberg Zürich, Switzerland, 1998, pp. 1–4.

* cited by examiner

Primary Examiner—Stanley S. Silverman
Assistant Examiner—Peter J Lish
(74) Attorney, Agent, or Firm—Young & Thompson

(57) ABSTRACT

A burner for producing carbon black, includes a combustion chamber which can be supplied with fuel gas and an oxidizing gas in such a way that a diffusion flame producing carbon black particles is generated in the combustion chamber. The burner is also provided with a carbon-black discharge line. Carbon black formed in the combustion chamber can be discharged via an opening in the combustion chamber which feeds into the carbon-black discharge line. The discharge line is also provided with an opening through which an extinguishing gas can be supplied to the carbon-line. The burner permits the stable and reproducible production of carbon black particles which present well defined chemical and physical characteristics.

14 Claims, 1 Drawing Sheet

BURNER FOR PRODUCING CARBON BLACK

TECHNICAL FIELD

The invention relates to a burner for generating soot, to a method for generating soot, and to a method for gauging soot particle measuring apparatus.

PRIOR ART

To date, for the study of the properties of soot particles and for gauging and/or calibrating soot particle measuring apparatus, Diesel engines have often been used as sources resp. generators of soot. As a source of soot for the laboratory examination of soot particles, Diesel engines suffer from a number of disadvantages. Thus, for example, Diesel engines are relatively space-consuming, and their operation involves noise and exhaust gas emissions. For the purpose of gauging and/or calibrating soot particle measuring apparatus, Diesel engines are disadvantageous as various properties of the produced soot particles such as e.g. their size distribution, their number density, and/or their chemical composition, are difficult or impossible to control. Moreover, the characteristic properties of the soot particles produced by means of Diesel engines are not stable over the total lifetime of a Diesel engine. Therefore, the soot produced by Diesel engines is hardly reproducible. EP-AZ-353 746 discloses an apparatus for producing a solid aerosol where carbon aerosols are produced by spark discharges across particle-releasing graphite electrodes. Indeed, with regard to its space requirements and emissions, this apparatus is substantially more suitable for laboratory use than a Diesel engine. However, the chemical and physical properties of the generated carbon aerosols are quite different from those of combustion soot particles and are therefore not representative of the latter in most cases.

U.S. Pat. No. 4,751,069 discloses a method and apparatus for the production of highly black soot. Through a nozzle, the starting material for the soot generation, a catalytically cracked heavy oil, is sprayed into the combustion zone of a reactor where the poorly combustible heavy oil is cracked in a hot gas flow produced by means of air and a separate fuel (e.g. natural gas), thereby generating soot. In order to produce the hot gas flow, the fuel is first mixed with the air and then burned, i.e. the heat is generated by means of a premixed flame. The soot generation is stopped by means of a quenching medium that is sprayed in through another nozzle downstream. The quenching medium is natural gas. In the quenching process, the latter is pyrolized along with the heavy oil. As a result, the natural gas reacts with the generated soot particles, thereby modifying their porosity.

The publication "Generation of Combustion Soot Particles for Calibration Purposes", written by the inventor of the object of the present invention and published on occasion of the "2nd ETH Workshop on Nanoparticle Measurement, ETH Hönggerbert Zürich, Switzerland, 7 Aug. 1998", describes a burner whose open combustion chamber is supplied with fuel gas and oxidizing gas in such a manner that a so-called co-flow diffusion flame is formed in the combustion chamber. The soot extracting duct whose inlet opening is located in the flame. Indeed, the chemical and physical properties of the soot generated in this burner are similar to those of the combustion soot from Diesel engines and heating installations. However, the burner is very sensitive to variations in the flow pattern within the soot extracting duct. Even small modifications in the geometrical shape of portions of a measuring device (e.g. of a measuring sensor) located within the soot extracting duct may influence the flame and the properties of the generated soot particles. The result are problems with respect to the reproducibility of the soot particles generated by the burner. Moreover, the inlet of the soot extracting duct is subject to intense soot deposition as it is located in the flame, thereby causing problems with regard to the temporal stability of the properties of the soot particles generated by the burner.

SUMMARY OF THE INVENTION

The object of the invention is to provide a burner for the stable and reproducible generation of soot in such a manner that the generated soot particles have well-defined chemical and physical properties.

According to the invention, a burner for generating soot comprises a combustion chamber capable of being supplied with fuel gas and oxidizing gas in such a manner that a diffusion flame generating soot particles is formed in the combustion chamber. The burner is further provided with a soot discharge line. The soot generated in the combustion chamber can be extracted by the soot discharge line through an inlet from the combustion chamber to the soot discharge line. The soot discharge line is provided with an additional inlet allowing to supply the soot discharge line with a quenching gas.

The substance flow entering the soot discharge line from the combustion chamber, which contains the soot particles formed in the diffusion flame, the combustion gases, and possible residues of non-burned fuel and/or oxidizing gas, inter alia, can be mixed in the soot discharge line with a quenching gas and thereby extinguished, so that combustion processes in the flow are immediately stopped. The quenching gas, which is cooler than the flow leaving the combustion chamber, further results in a cooling of the substance flow from the combustion chamber and in a dilution of the substance flow. Due to the fact that the combustion processes are stopped, the soot particles are cooled, and the substance flow from the combustion chamber is diluted, further uncontrolled coagulations and/or other reactions of the soot particles formed in the flame are largely excluded. Therefore, the combustion and the soot formation take place on a flow path of a clearly defined length from the beginning of the flame in the combustion chamber up to the quenching zone in the soot discharge line. The soot formation time is therefore also defined via the flow rate, which is a necessary condition for the generation of soot particles having well-defined chemical and physical properties. Furthermore, soot deposits in the burner are reduced by the fact that the substance flow from the combustion chamber is extinguished, thereby improving the temporal stability of the properties of the soot particles generated by means of the burner of the invention. In addition, due to the fact that a relatively strong quenching gas flow is admixed to the substance flow entering the soot discharge line from the combustion chamber, the influence of variations in the flow pattern downstream of the inlet from the combustion chamber with regard to the flow pattern within the combustion chamber is reduced. The result is an improved reproducibility of the soot particles generated by the burner.

In a burner according to a preferred embodiment of the invention, the quenching gas inlet is connected to the soot discharge line upstream of the inlet from the combustion chamber, the inlet from the combustion chamber preferably being connected to the soot discharge line in such a manner that the flow from the combustion chamber meets the quenching gas flow essentially orthogonally. In alternative embodiments of the invention, the quenching gas may also be conducted into the soot discharge line downstream of the inlet from the combustion chamber, or the quenching gas flow and the combustion chamber flow may meet each other at an angle other than 90°.

According to a further aspect of the invention, a burner for generating soot comprises a combustion chamber capable of being supplied through supply inlets with fuel gas and oxidizing gas in such a manner that a diffusion flame generating soot particles is formed in the combustion chamber, as well as a soot discharge line having at least one inlet from the combustion chamber and allowing to extract the soot formed in the combustion chamber. Except for the feed inlets for the fuel gas and the oxidizing gas and the openings towards the soot discharge line, the combustion chamber is hermetically closed such that all matter leaving the combustion chamber is discharged through the soot discharge line. The result is an improved stability of the burner with regard to the properties of the generated soot particles in variable ambient conditions. This aspect of the invention has been found to be advantageous also in burners without a quenching gas supply. Preferably, the distance between the fuel gas and oxidizing gas admissions, on one hand, and the openings leading to the soot discharge line, on the other hand, is selectively adjustable.

According to another preferred embodiment of the invention, a burner comprises an outer tube for the supply of the oxidizing gas to the combustion chamber while an inner tube is disposed coaxially to the outer tube inside the latter for the supply of the fuel gas to the combustion chamber, thereby allowing to form a co-flow diffusion flame in the combustion chamber.

Preferably, a burner according to the invention is further provided with means for diluting the number density of the soot particles in the flow containing soot particles downstream of the combustion chamber. Thus, e.g. for gauging and/or calibrating soot particle measuring apparatus, the number density can be adapted to the measuring range of the measuring apparatus.

Furthermore, a burner according to the invention is preferably provided with a mixing device allowing to admix an inert gas to the fuel gas upstream of the combustion chamber, the mixing ratio being selectively adjustable. This allows to influence the size distribution, the number and/or the concentration of the generated soot particles, inter alia.

In a method of the invention for generating soot, a fuel gas and an oxidizing gas are supplied to a combustion chamber of a burner in such a manner as to form a diffusion flame generating soot particles, the flow containing soot particles emitted from the combustion chamber being mixed with a flow of quenching gas in order to suffocate the combustion processes in the flow containing soot particles.

Advantageously, the fuel gas and the oxidizing gas are supplied to the combustion chamber such as to form a laminar diffusion flame. By creating a flow pattern forming a laminar diffusion flame in the combustion chamber, it is possible to conduct the soot particles generated in the combustion chamber through the burner in such a manner that soot deposits in the burner are largely avoided. In combination with the above-mentioned aspect of the co-flow diffusion flame, a laminar co-flow diffusion flame can be formed in the combustion chamber of a burner according to the invention.

Preferably, the quenching gas is an inert gas selected from a group including the noble gases, nitrogen, and carbon dioxide.

Prior to being mixed with the flow containing soot particles, at least one additional gas or aerosol can be admixed to the quenching gas in order to form a flow containing soot particles which is as similar as possible to flows containing soot particles from internal combustion engines and/or heating installations. In this manner, the method of the invention allows to simulate soot-forming reactions and corresponding flows which are very similar to combustion gas flows from internal combustion engines and/or heating installations.

A method for gauging a soot particle measuring apparatus distinguishes itself by the fact that for gauging the soot particle measuring apparatus, the latter is supplied with soot particles generated by a burner according to the invention.

In conjunction with the accompanying drawings, the following detailed description of the present invention will only serve as an example for a better understanding of the invention and is not intended to limit the scope of the claims. Further advantageous embodiments and combinations of features of the invention result from the following description, the drawings, and the totality of the claims.

BRIEF DESCRIPTION OF THE DRAWINGS

The drawing of FIG. 1 used in the explanation of the exemplary embodiment shows a simplified, schematic sectioned side elevation of a burner of a preferred embodiment of the invention.

EMBODIMENTS OF THE INVENTION

Figure 1:
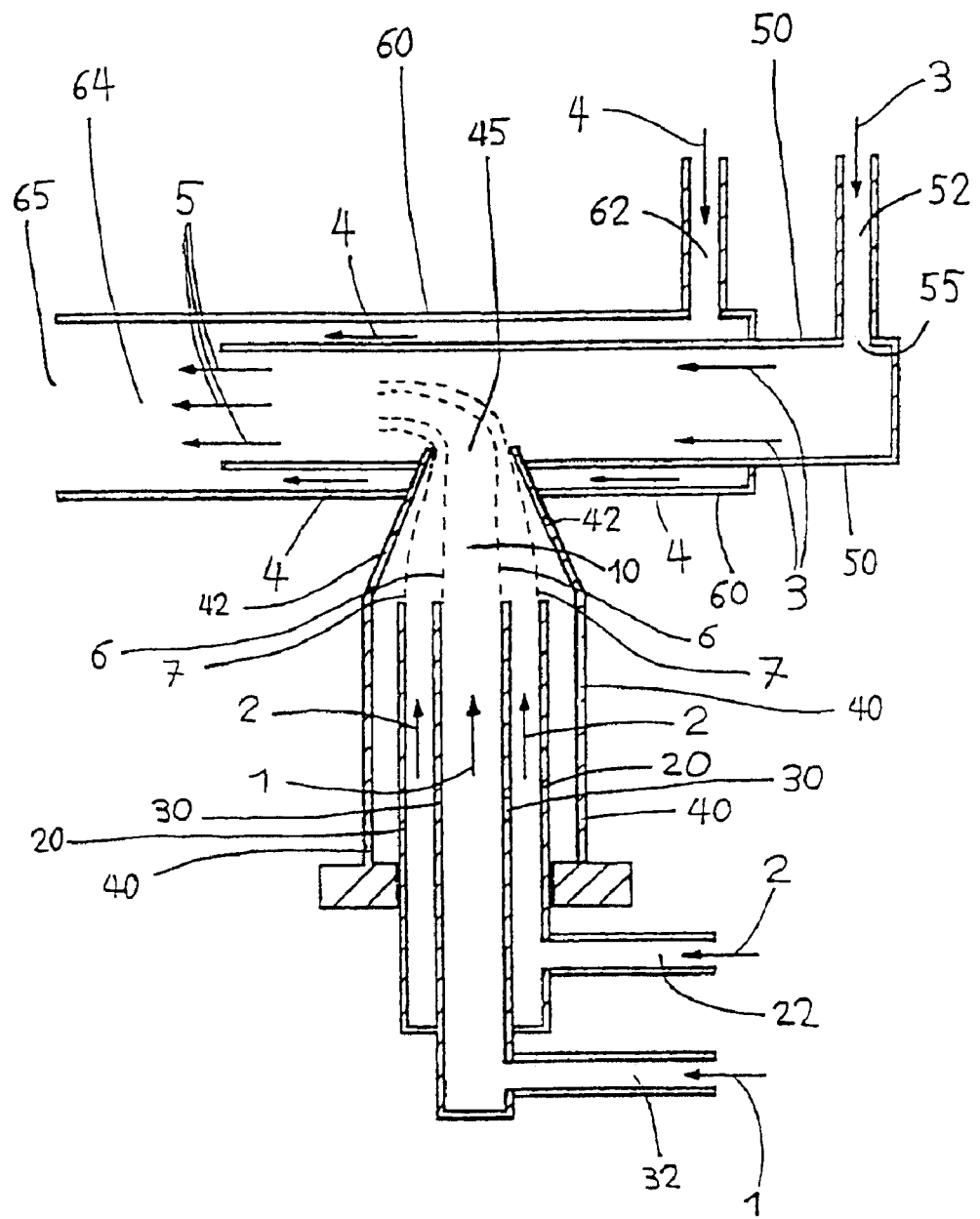

The burner illustrated in FIG. 1 comprises a unilaterally closed circular cylindrical outer tube 20 for the supply of an oxidizing gas and, coaxially inside outer tube 20, a unilaterally closed circular cylindrical inner tube 30 for the supply of a fuel gas. The two supply tubes 20, 30 are arranged essentially vertically. Outer tube 20 is connected in a gas conducting manner near its closed, lower tube end to a supply line 22 of the oxidizing gas, and inner tube 30 is connected in a gas conducting manner near its closed, lower tube end to a supply line 32 of the fuel gas. Inner tube 30 traverses the bottom of outer tube 20, the passage through the bottom of outer tube 20 being hermetically sealed and the two tubes 20, 30 being tightly connected to each other at the junction.

The open upper tube end of outer tube 20 and the open upper tube end of inner tube 30, which is situated at the same height essentially, end in a combustion chamber 10 of the burner. The coaxial arrangement of supply tubes 20, 30 of the oxidizing gas and the fuel gas allows a co-flow diffusion flame to be formed in burner space 10.

Combustion chamber 10 is limited by a tubular housing comprising a cylindrical lower section 40 and an upwardly tapered, frustoconical upper section 42. The upwardly tapering shape of combustion chamber 10 prevents an expansion of the flow resp. of the flame in combustion chamber 10. Coaxial supply tubes 20, 30 of the oxidizing gas and the fuel gas pass through the bottom of cylindrical combustion chamber section 40 while outer tube 20 along with coaxially arranged inner tube 30 is vertically displaceable with respect to combustion chamber housing 40, 42. Vertical displacement of coaxial supply tubes 20, 30 of the oxidizing gas and the fuel gas allows to vary the effective height of combustion chamber 10, the effective height of combustion chamber 10 being defined by the vertical distance between the openings of supply tubes 20, 30, arranged at the same height in combustion chamber 10, and outlet opening 45 of combustion chamber 10 at the top of the frustoconical point of combustion chamber housing 42.

Outlet opening 45 of combustion chamber 10 communicates with a circular cylindrical tube 50 which is closed on one side and arranged essentially orthogonally with respect to combustion chamber housing 40, 42 resp. to supply tubes 20, 30 of the oxidizing gas and the fuel gas, and which serves as a soot discharge line. This soot extraction tube 50 is arranged inside a circular cylindrical jacket 60 which is closed on one side. The cylindrical envelope of jacket 60 and the cylindrical envelope of soot discharge line 50 are traversed by the frustoconical portion 42 of the combustion chamber housing, the resulting junctions being hermetically sealed, and the combustion chamber housing being tightly connected to jacket 60 resp. to soot discharge line 50 at the junctions.

Soot extraction tube 50 and jacket 60 are arranged coaxially to each other and open resp. closed on the same tube side. Soot discharge line 50 traverses the closed tube end of jacket 60, the passage through the closure wall of jacket 60 being hermetically sealed, and the two tubes 50, 60 being tightly connected to each other at the junction. Soot discharge line 50 is connected in a gas conducting manner near its closed tube end to a supply line 52 of a quenching gas, and jacket 60 is connected in a gas conducting manner near its closed tube end to a supply line 62 of a diluting gas.

At its open tube end, jacket 60 extends past the open tube end of soot discharge line 50 disposed in its interior, thereby creating a dilution zone 64 for an additional dilution. In dilution zone 64, the substance flow leaving soot extraction tube 50 (which includes the matter emitted from combustion chamber 10, extinguished by the quenching gas and diluted for a first time) is mixed with the diluting gas and thereby further diluted.

All in all, the burner constitutes a system which is hermetically sealed from the environment except for supply line connections 32, 22, 52, 62 of the fuel gas, the oxidizing gas, the quenching gas, and the diluting gas, respectively, as well as for the open tube end of jacket 60 which serves as the outlet opening 65 of the burner.

In operation of the burner illustrated in FIG. 1, the fuel gas is supplied to the burner through fuel gas supply line 32, and the oxidizing gas through oxidizing gas supply line 22. In FIG. 1, the flow of the fuel gas is illustrated by arrows 1 and the flow of the oxidizing gas by arrows 2. The fuel gas is preferably in the form of a hydrocarbon gas (e.g. propane). However, other fuel gases resp. gas mixtures are possible, such as e.g. vaporized Diesel fuel or gasoline. The oxidizing gas is preferably synthetic air (80% nitrogen gas, 20% oxygen gas). However, other oxidizing gases may be used as well.

The fuel gas supply line 32 is further provided with a mixing valve (not shown) allowing to admix an inert gas to the fuel gas in order to dilute the fuel content of the gas mixture. Gaseous nitrogen may e.g. be used for diluting the fuel gas. This allows to regulate the size distribution of the soot particles generate in the burner. The burner illustrated in FIG. 1 is capable of generating soot particles whose size ranges from one micrometer to some nanometers, a corresponding adjustment of the burner parameters allowing to select any desired size distribution within this range. Oxidizing gas supply line 22 is also provided with a mixing valve (not shown) allowing to admix oxygen gas to the oxidizing gas. Thus, in the burner illustrated in FIG. 1, both the fuel gas content and the oxygen content are adjustable in a controlled manner.

The quenching gas supply line 52 is provided with a mixing valve (not shown) as well. This mixing valve allows to admix one or a plurality of further gases and/or one or a plurality of further aerosols to the quenching gas prior to the quenching gas inlet 55 into soot discharge line 50. The burner can thus be used as an exhaust gas simulator allowing to simulate combustion gas flows which are very similar to combustion gas flows from real internal combustion engines and/or heating installations. The gases and/or aerosols admixed to the quenching gas for the purpose of simulating realistic combustion gas flows are e.g. ozone, sulphur dioxide, oxygen, water vapour, dust, latex aerosols, hydrocarbons, benzol vapour, and other substances contained in real combustion gases.

Preferably, the flow conditions in the supply lines (flow rate, gas pressure, etc.) are adjusted such that essentially laminar fuel gas and oxidizing gas flows are obtained in combustion chamber 10. Thus, after igniting the flame, a so-called laminar co-flow diffusion flame is formed in combustion chamber 10 whose shape within combustion chamber 10 is almost cylindrical. Generally, however, the burner illustrated in FIG. 1 can also be operated under such flow conditions that a turbulent diffusion flame forms in the combustion chamber.

The fuel gas flows into combustion chamber 10 in a central portion of a cylindrical gas flow, the fuel gas flow being surrounded by an oxidizing gas flow on the outside. In the flame, the fuel gas is first pyrolyzed in a central area of the flow, i.e. carbon is being separated from hydrogen. The hydrogen will diffuse outwards to the border of the flame much faster than the carbon. Consequently, at the border of the flame, mainly hydrogen will be oxidized by the oxygen contained in the oxidizing gas surrounding the flame, while an oxygen deficit and an excess of carbon prevails in the center of the flame. From the center of the flame, the pyrolyzed carbon atoms combine with other carbon atoms, thereby forming soot particles. Thus, in the case of a laminar diffusion flame, soot particles are mainly produced in the area of the fuel gas flow. This area is indicated in FIG. 1 by the inner interrupted lines 6. This portion of the flow, which contains the major part of the generated soot particles, is surrounded by a flow of combustion gases (e.g. water vapour) whose outer limit is indicated in FIG. 1 by the outer interrupted lines 7. The effect of this envelope surrounding the soot particles is that the soot particles contact the walls of the burner only after the quenching, cooling and diluting operations described below. Soot deposits in the burner are thereby effectively prevented.

The cylindrical flame, which is forwardly open as seen in the direction of the flow, extends through outlet opening 45 of combustion chamber 10 into soot discharge line 50. In operation of the burner, a quenching gas is supplied to soot discharge line 50 through quenching gas supply line 52 and a quenching gas inlet 55. The quenching gas flow is indicated in FIG. 1 by arrows 3. Thus, in the area of outlet opening 45 of combustion chamber 10, soot discharge line 50 is filled with a flow of quenching gas 3. The flame, which extends into soot discharge line 50, is thereby suffocated, cooled, and diluted in the area of outlet opening 45 of combustion chamber 10.

The flow conditions inside soot discharge line 50 are preferably adjusted such that an essentially laminar flow of quenching gas 3 results upstream of outlet 45 of combustion chamber 10 in order to prevent that turbulence may affect combustion chamber 10 through opening 45. For this purpose, soot discharge line 50 may be provided with gas guiding lamellae upstream of outlet opening 45 of combustion chamber 10.

The quenching gas is preferably nitrogen gas. Generally, however, other oxidation-inhibiting gases may be used as well, e.g. noble gases, other inert gases, or carbon dioxide.

From outlet opening 45 of combustion chamber 10, the flow from the combustion chamber (indicated in FIG. 1 by arrows 5), mixed with quenching gas, flows through the open tube end of soot extraction tube 50 and is subsequently mixed in diluting zone 64 inside jacket 60 with the diluting gas, the latter being supplied to jacket 60 by diluting gas supply line 62. The flow of the diluting gas is indicated in FIG. 1 by arrows 4. The diluting gas is preferably synthetic air. Generally, however, other suitable diluting gases may be used in the operation of the burner illustrated in FIG. 1, or a dilution may be omitted.

The additional dilution in dilution zone 64 of the substance flow containing the soot particles generated in the burner serves for the variation of the number density of soot particles such that the density is comprised inside the measuring range of a soot particle measuring apparatus (not shown) supplied with the soot particles generated in the burner.

In summary, the invention provides a burner for the stable and reproducible generation of soot in such a manner that the generated soot particles have well-defined chemical and physical properties.

What is claimed is:

1. A burner for generating soot, comprising:
   a combustion chamber for receiving fuel gas and oxidizing gas to generate a diffusion flame therein; and
   a soot discharge line for extracting soot formed in said combustion chamber, the soot discharge line having a first inlet for receiving an output from said combustion chamber and a second inlet upstream from the first inlet for the supply of a quenching gas that suffocates combustion at the output from said combustion chamber,
   wherein said first and second inlet are arranged such that the supply of the quenching gas is transverse to the output from said combustion chamber.

2. The burner according to claim 1, wherein said combustion chamber has exclusively openings for receiving fuel gas and oxidizing gas and for discharging all matter flowing out of said combustion chamber through said soot discharge line.

3. The burner according to claim 1, wherein said combustion chamber comprises supply inlets for supplying fuel gas and oxidizing gas therein, a distance from said supply inlets to said second inlet being adjustable.

4. The burner according to claim 1, wherein said combustion chamber comprises an outer tube for receiving oxidizing gas and an inner tube for receiving fuel gas, said outer and inner tube being coaxial.

5. The burner according to claim 1, further comprising means for diluting the number density of soot particles discharged through said soot discharge line.

6. The burner according to claim 1, further comprising a mixing device for admixing an inert gas to the fuel gas with an adjustable mixing ratio.

7. A burner for generating soot, comprising:
   a combustion chamber for receiving a fuel gas and an oxidizing gas to generate a diffusion flame therein;
   a soot discharge line having an inlet for receiving an output from said combustion chamber, said soot discharge line being adapted to receive a quenching gas upstream of said inlet, wherein said soot discharge line is transverse to said combustion chamber and opens to a dilution zone downstream of said inlet; and
   a diluting gas line that opens to said dilution zone downstream of said inlet, said diluting gas line being adapted to receive a diluting gas upstream of said dilution zone.

8. The burner of claim 7, wherein said diluting gas line is concentric with and radially exterior to said soot discharge line.

9. The burner of claim 7, wherein said combustion chamber comprises an inner tube for receiving the fuel gas and an outer tube for receiving the oxidizing gas, said inner and outer tubes being concentric.

10. The burner of claim 7, wherein said combustion chamber comprises a first tube for receiving the fuel gas and a second tube for receiving the oxidizing gas, first ends of said first and second tubes opening to said combustion chamber, and wherein a distance from said first ends of said first and second tubes to said soot discharge line is adjustable.

11. The burner of claim 10, wherein said first and second tubes are concentric.

12. The burner of claim 7, wherein said combustion chamber comprises a frustoconical housing with a smaller end thereof opening to said soot discharge line.

13. A method for generating soot, comprising the steps of:
   receiving a fuel gas and an oxidizing gas in a combustion chamber for generating a diffusion flame therein;
   providing an output from the combustion chamber through an inlet to a soot discharge line, the soot discharge line receiving a quenching gas upstream of the inlet for the output from the combustion chamber, wherein the soot discharge line opens to a dilution zone downstream of the inlet; and
   providing a diluting gas from a diluting gas line that opens to the dilution zone downstream of the inlet, the diluting gas line receiving the diluting gas upstream of the dilution zone.

14. The method of claim 13, wherein the combustion chamber has a first tube that receives the fuel gas and a second tube that receives the oxidizing gas, first ends of the first and second tubes opening to the combustion chamber, and further comprising the step of adjusting a distance from the first ends of the first and second tubes to the soot discharge line.

* * * * *